B. G. VAN DYKE, Jr.
CAR TRUCK AND MOUNTING.
APPLICATION FILED JULY 3, 1919.

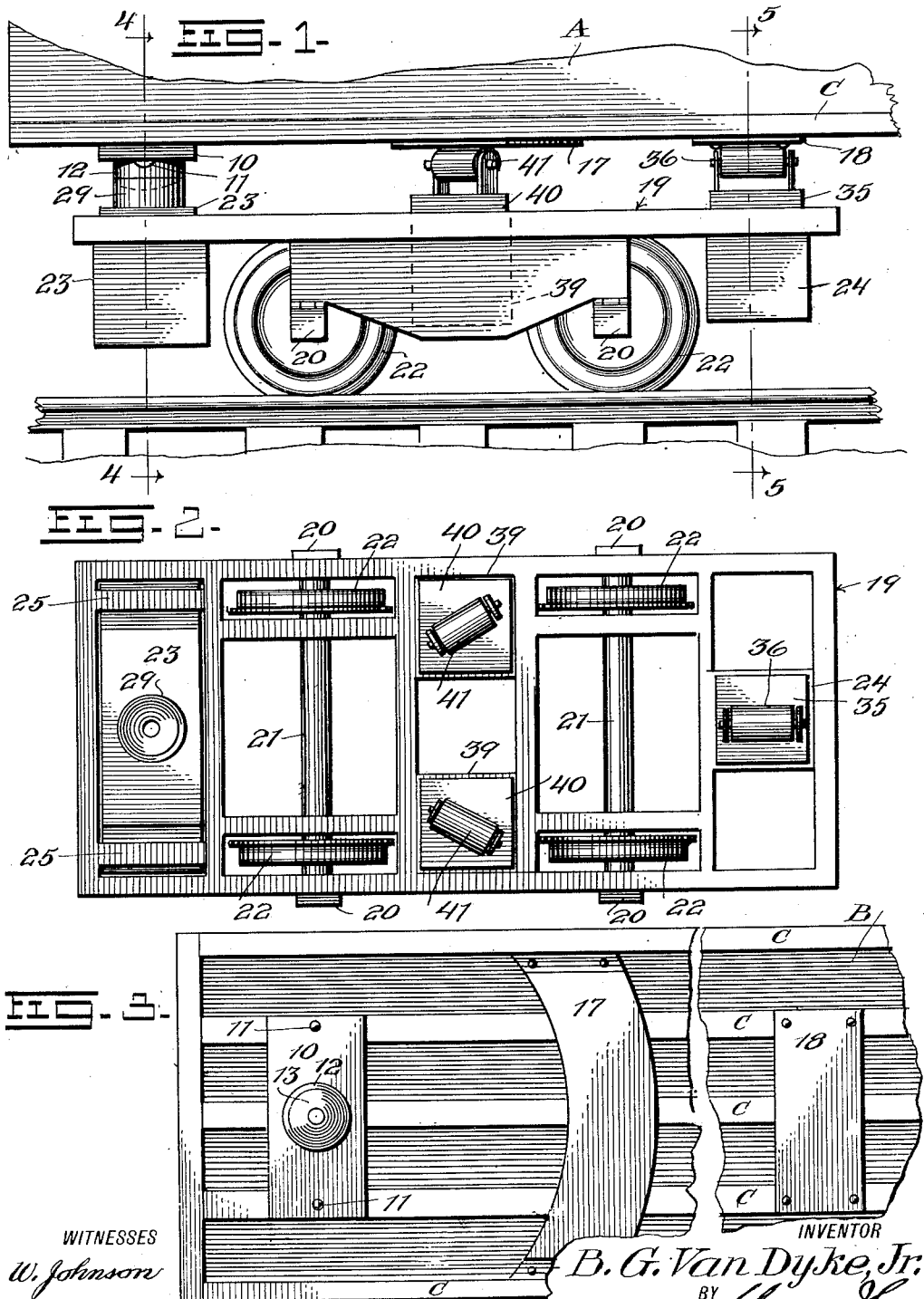

1,331,887.

Patented Feb. 24, 1920.
2 SHEETS—SHEET 2.

WITNESSES
W. Johnson

INVENTOR
B. G. Van Dyke, Jr.
BY
ATTORNEYS

UNITED STATES PATENT OFFICE.

BENJAMIN G. VAN DYKE, JR., OF DETROIT, MICHIGAN.

CAR-TRUCK AND MOUNTING.

1,331,887.　　　　　Specification of Letters Patent.　　Patented Feb. 24, 1920.

Application filed July 3, 1919. Serial No. 308,448.

*To all whom it may concern:*

Be it known that I, BENJAMIN G. VAN DYKE, Jr., a citizen of the United States, residing at Detroit, in the county of Wayne and State of Michigan, have invented new and useful Improvements in Car-Trucks and Mountings, of which the following is a specification.

This invention relates to railway rolling stock, particularly to trucks, and has for its object the provision of a novel truck pivotally mounted with respect to the car whereby to facilitate rounding curves and consequently saving wear and tear on the wheel flanges and other parts, the truck being furthermore equipped with springs which provide resilience and which also tend to prevent lateral motion of the truck under the car body.

An important object is the provision of a truck structure in which the truck carries guide rollers which engage against wear plates secured upon the underside of the car body, these wear plates being arcuate and concentric with the king bolt whereby the truck is pivotally mounted.

Another object is the provision of a novel king bolt connection whereby the truck is pivotally mounted.

An additional object is the provision of a mounting of this character which will be comparatively simple and inexpensive in manufacture and installation, which will add materially to the comfort of the occupants of the car, which will be efficient and durable in use, and a general improvement in the art.

With the above and other objects and advantages in view, the invention consists in the details of construction to be hereinafter more fully described and claimed, and illustrated in the accompanying drawings in which—

Figure 1 is a side elevation of my car truck,

Fig. 2 is a top plan view thereof detached from the car,

Fig. 3 is a bottom plan view showing the elements carried by the car and coöperating with the truck to form the mounting for the latter.

Figure 4:
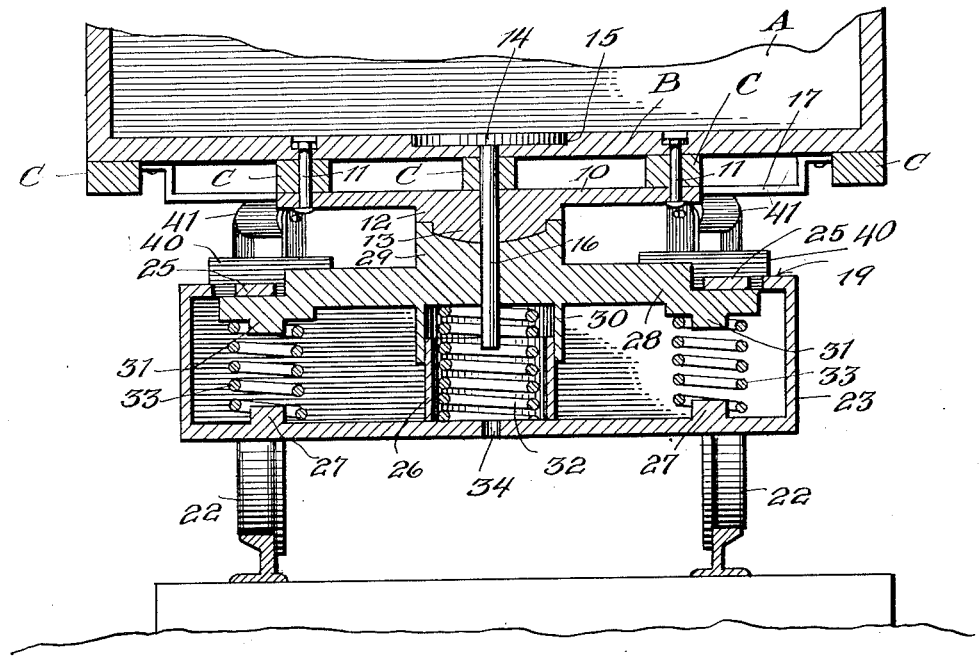
Fig. 4 is a cross sectional view on the line 4—4 of Fig. 1.
Figure 5:
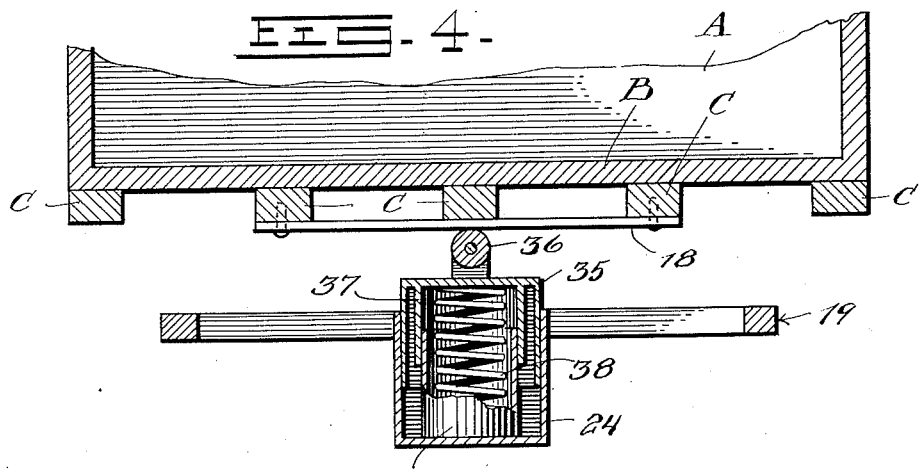
Fig. 5 is a cross sectional view on the line 5—5 of Fig. 1.

Referring more particularly to the drawings, the letter A designates the car body having the bottom B upon which are secured longitudinally extending beams C.

In carrying out my invention I provide a plate 10 which is secured upon the underside of the bottom of the car and which is bolted to certain of the longitudinal beams C, as shown at 11. At its central portion the plate 10 has formed thereon a depending cylindrical member 12 which terminates in a reduced extension 13 having a convex face. The king bolt is designated by the numeral 14 and has its head portion engaged within a recess 15 in the bottom of the car and its shank 16 extending through the bottom of the car, the central longitudinal beam C, and through and below the projection 12. Also secured upon the underside of the car, by means of suitable bolts, are wear plates 17 and 18, the former being arcuate in shape and concentric with the king bolt, and the latter being straight and shorter.

The truck comprises a rectangular frame 19 carrying the usual boxings 20 within which are journaled axles 21 carrying wheels 22. At one end portion, the frame 10 is formed as a casing 23 and at the other end is formed as a casing 24, these casings being open at the top and the former being provided across its top with transverse strips 25. Formed centrally upon the top of the bottom of the casing 23 is an upstanding cylindrical member 26 and extending upwardly at each side of this member 26 are projections 27. Disposed within the casing 23 and arranged for vertical movement therein is a plate 28 provided centrally with an upstanding cylindrical projection 29 of the same diameter as the projection 12 on the plate 10, and provided with a concaved recess conformingly receiving the reduced extension 13 on the projection 12. This plate 28 is further provided with a hole journally receiving the shank 16 of the king bolt. Formed centrally upon the underside of the plate 28 is a cylindrical shell member 30 telescoping over the cylindrical member 26 and formed on the underside of the plate 28 are projections 31 in vertical alinement with the projections 27. A coil spring 32 is disposed within the cylindrical members 26 and 30 and abuts at one end against the bottom of the casing 23, and at its other end against the underside of the plate 28. A coil spring 33 is disposed within each end of the casing 23 between the bottom of the casing and the underside of the plate 28 and these last mentioned springs are held against displacement by means of the projections 27 and 31. These springs of course provide resilience and permit movement of the plate 28 with respect to the casing 23. The bottom the casing 23 is provided with a hole 34 for the accommodation of the king bolt in order to avoid breaking the same when a sudden shock occurs. The ends of the plate 28 engage beneath the transverse strips 25 extending across the open top of the casing 23 for preventing excessive upward movement of the plate 28 with respect to the casing 23.

Disposed within the casing 24 is an inverted shell member 35 upon which is mounted a roller 36 which bears against the wear strip 18 on the bottom of the car. The casing 24 and shell member 35 are telescopically engaged and carry cylindrical members 36 and 37, respectively, which are also telescopically engaged and within which is disposed a coil spring 38.

At substantially its center, the truck frame 19 is formed with open topped casings 39 which are arranged at the sides of the frame, as shown. These casings are rectangular in form and have slidable therein inverted shell members 40, upon which are mounted rollers 41 which are arranged at an angle and which bear against the wear strip 17. Coil springs, not shown, are disposed within the casings 39 and shells 40 in exactly the same manner as in the casing 24 and shell 35, illustration of one of these members being deemed sufficient.

From the foregoing description and a study of the drawings it will be apparent that the entire truck is pivoted with respect to the car body by means of the king bolt 14 and it will be seen that in rounding curves the trucks may follow the tracks with very little wear on the tracks and trucks as the trucks may move with respect to the car body, the rollers 36 and 41 riding upon the wear strips 18 and 17, respectively. It will also be observed that resilience is afforded by the provision of the springs 32 and 33 at the pivoted end of the truck and by the springs 38 at the intermediate and rear portions of the truck so that comfortable riding will be assured the occupants of the car and whereby damage caused by excessive vibration and jars will be prevented. It will also be observed that the springs 33 serve as equalizing springs for reducing side swing of the car to the minimum so as to prevent excessive strain upon any of the parts.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A car truck and mounting comprising a rigid frame, axles journaled therein and carrying wheels, an upwardly spring pressed plate at one end of said frame, a plate secured upon the underside of the car and revolubly engaging said first named plate, a king bolt extending through and pivotally connecting said plates, a pair of casing members in said frame at the intermediate portion and adjacent the sides thereof and having their tops open, upwardly spring pressed members slidably mounted within said casings, rollers carried by the upper ends of said spring pressed members and arranged at an angle with respect to the longitudinal axis of the frame, an arcuate wear strip secured upon the bottom of the car concentric with said king bolt and engaged by said rollers, a casing provided centrally at the other end of said frame, an upwardly spring pressed member slidable within said last named casing, a roller journaled on the top of said last named member coaxially with the longitudinal axis of the frame, and a second wear strip secured upon the bottom of the car and engaged by said last named roller.

2. A car truck and mounting comprising a rigid frame, axles journaled therein and carrying wheels, an upwardly spring pressed plate at one end of said frame, a plate secured upon the underside of the car and revolubly engaging said first named plate, a king bolt extending through and pivotally connecting said plates, a pair of casing members in said frame at the intermediate portion and adjacent the sides thereof and having their tops open, upwardly spring pressed members slidably mounted within said casings, rollers carried by the upper ends of said spring pressed members and arranged at an angle with respect to the longitudinal axis of the frame, and an arcuate wear strip secured upon the bottom of the car concentric with said king bolt and engaged by said rollers.

3. A car truck and mounting comprising a rigid frame, axles journaled in said frame and carrying wheels, a casing extending transversely of said frame at one end thereof and having its top open, a plate disposed within said casing and provided centrally of its top with a projection having a circular recess formed therein, a plate secured upon the bottom of the car and carrying a projection on its underside engaged revolubly within said recess, a king bolt extending downwardly from the bottom of the car and revolubly engaging said plates, a plurality of springs engaging the bottom of said casing and the underside of said first named plate whereby to urge said first named plate upwardly, transverse strips extending across the open top of said casing and engageable by said first named plate for limiting upward movement thereof, upwardly spring pressed members carried by said frame, rollers mounted upon the upper ends of said members, and wear strips secured upon the bottom of the car and engaged by said rollers.

4. A car truck and mounting comprising a rigid frame, axles journaled in said frame and carrying wheels, casings on said frame at the ends thereof having their tops open, upwardly spring pressed members disposed within said casings, a plate secured upon the underside of the car and carrying a projection engaging one of said members, a king bolt extending downwardly from the car through said plate and said projection and revolubly engaging the associated spring pressed member, rollers mounted upon the upper ends of the others of said members, and arranged at an angle with respect to the longitudinal axis of the frame, and an arcuate wear strip secured on the bottom of the car and engaged by said rollers.

BENJAMIN G. VAN DYKE, Jr.